United States Patent [19]

Pruckmayr

[11] Patent Number: 4,510,333

[45] Date of Patent: Apr. 9, 1985

[54] METHOD FOR PREPARING POLY(TETRAMETHYLENE ETHER) GLYCOL HAVING NARROW MOLECULAR WEIGHT DISTRIBUTION

[75] Inventor: Gerfried Pruckmayr, Media, Pa.

[73] Assignee: E. I. Du Pont de Nemours and Company, Wilmington, Del.

[21] Appl. No.: 617,607

[22] Filed: Jun. 5, 1984

[51] Int. Cl.³ .............................................. C07C 41/14
[52] U.S. Cl. .................................................. 568/617
[58] Field of Search ........................................ 568/617

[56] References Cited

U.S. PATENT DOCUMENTS

| 2,751,419 | 6/1956 | Hill, Jr. et al. | 568/617 |
| 2,856,370 | 10/1958 | Mutterties | 568/617 |
| 3,454,652 | 7/1969 | Dunlop et al. | 568/617 |

FOREIGN PATENT DOCUMENTS

| 646883 | 8/1962 | Canada | 568/617 |
| 965764 | 8/1964 | United Kingdom | 568/617 |
| 1512528 | 6/1978 | United Kingdom | 568/617 |

OTHER PUBLICATIONS

Rosenberg et al., "Journal of Polymer Science", Part C, No. 16, pp. 1917–1929, (1967).
"Synthesis of Narrow Distribution Polytetrahydrofuran," Croucher and Wetton, *Polymer*, 1976, vol. 17, Mar.
"Preparation of Narrow–Molecular–Weight–Distribution Poly(tetrahydrofuran)," Fujimoto, Kawahashi, Nagasawa and Takahashi, *Polymer J.*, vol. 11, No. 3, 1979.

*Primary Examiner*—J. E. Evans

[57] ABSTRACT

In the preparation of poly(tetramethylene ether) glycol by the polymerization of tetrahydrofuran (THF) using a cationic initiator, molecular weight distribution (MWD) can be held within narrow limits by bringing the THF and the initiator together in a mol ratio such that the degree of polymerization will be at about a minimum and at a temperature which will promote about a maximum number of tertiary oxonium ions, then quickly cooling the reaction mass to $-25°$ C. to $+25°$ C., and then adding enough THF to complete the polymerization. When the desired molecular weight and MWD have been reached, the polymerization is quenched and the polymer isolated.

5 Claims, No Drawings

METHOD FOR PREPARING POLY(TETRAMETHYLENE ETHER) GLYCOL HAVING NARROW MOLECULAR WEIGHT DISTRIBUTION

DESCRIPTION

1. Technical Field

This invention relates to a method for preparing poly(tetramethylene ether) glycol (PTMEG). It is more particularly directed to a method for preparing PTMEG having a narrow molecular weight distribution (MWD).

2. Background of the Invention

PTMEG is a commodity in the chemical industry, often used in the preparation of polyurethanes and polyesters to supply the soft segment. PTMEG is ordinarily prepared by polymerization of tetrahydrofuran (THF), using a cationic initiator. This polymerization proceeds according to the general scheme

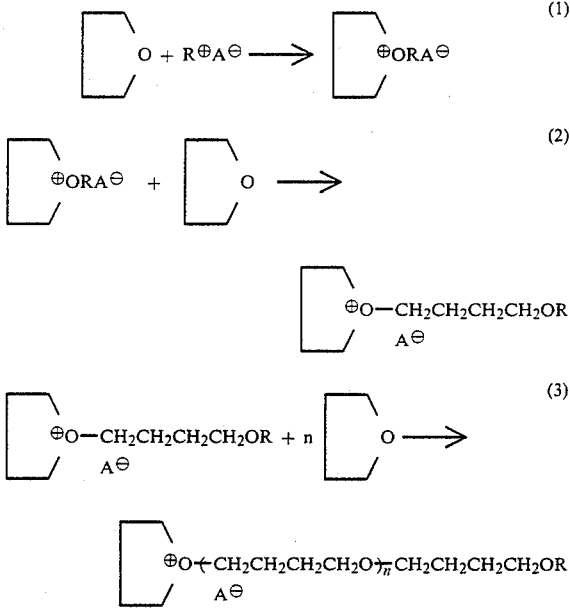

In the foregoing, $R^+A^-$ is a cationic initiator,

R is hydrogen or a group which can be removed from the polymer chain to give a hydroxyl end group, and A is a counterion. Illustrative counterions are $FSO_3^-$, $CF_3SO_3^-$, $PF_6^-$, $SbF_6^-$, $BF_4^-$, and $ClO_4^-$.

The termination and hydrolysis step is illustrated by equation 4:

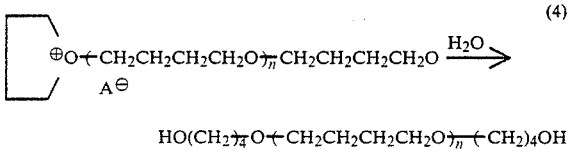

In cases where R in these schemes is H, step (1) can be considered a protonation of the monomer, step (2) an initiation and step (3) propagation of polymer chains. These steps, although consecutive for each individual growing chain, normally occur simultaneously in the bulk of the polymerization mass.

PTMEG made this way ordinarily has a MWD of 1.6–1.9 after isolation.

Polyurethanes and polyesters made with PTMEG having this MWD (especially PTMEG having a MWD at the high end of this range) tend to be unsuited for some applications. It is therefore often desirable to prepare polyurethanes and polyesters using PTMEG with a narrower MWD, i.e., one having a MWD of 1.1–1.4.

Such polymers can be prepared by heating a THF/initiator mixture to a temperature above the ceiling temperature for THF polymerizations, i.e. above 85° C., and then cooling the polymerization mixture before quenching. "Ceiling temperature" is that above which no chain propagation will occur.

However, heating a THF polymerization mixture to such a high temperature generally leads to color formation and to formation of other undesirable side products. Furthermore, cooling is a slow process, particularly in large-scale polymerizations. As a consequence, the molecular weight distribution of the final product is broader and the level of impurities higher than desirable for commercial applications.

I have now found that PTMEG of such narrow MWD and low levels of side-products can be prepared without heating the polymerization mixture to or above the ceiling temperature.

DETAILED DESCRIPTION

In the process of the invention, PTMEG of narrow MWD can be prepared by separating steps (1) and (2) from step (3). To accomplish this, THF and the initiator are mixed in such molar proportions that the degree of polymerization will be at about a minimum. This mixture is then brought to and held at a temperature at which about a maximum number of tertiary oxonium ions will be generated. Ordinarily, a temperature of 20°–80° C., preferably 40°–60° C., and a THF/initiator mol ratio of 4/1–1/1, preferably 2/1, will give maximum oxonium ion concentration and minimum degree of polymerization. This corresponds to steps (1) and (2) in the foregoing scheme.

Initiators which can be used are strong protonic acids, mixtures of acids, or mixtures of acids and salts, Lewis acids, oxonium salts, or salts which form the stable counterions mentioned earlier. Such initiators are described in more detail in P. Dreyfus, "Poly(tetrahydrofuran)," Gordon and Breach Science Publishers, N.Y. 1982, Chapter 3.

Illustrative of such initiators are fluosulfonic acid (FSA), FSA-oleum mixtures, FSA-sulfuric acid mixtures, mixtures of sulfuric acid and fluorides, $HSbF_6$, $HBF_4$ and mixtures of $HBF_4$ and $BF_3$, and mixtures of $HClO_4$ and sulfuric acid. FSA is preferred.

In cases where initiators are used which can lead to side reactions, it is important to keep reaction time for this portion of the procedure at a minimum.

The point at which tertiary oxonium ion concentration is at a maximum can be determined by magnetic resonance spectroscopy. When that point has been reached, the reaction mass is quickly cooled to within the range of −25° through +25° C., preferably −15° through +15° C., even more preferably 0° through +10° C., and is held at that temperature while enough THF (n in step 3) is added to the reaction mass to allow the polymerization to proceed to the desired point. This corresponds to step (3) in the foregoing scheme. The actual amount is of secondary importance because the polymerization will be deliberately interrupted before equilibrium is reached.

The reaction mass is then held at a temperature within the range −25° through +25° C. until the desired molecular weight and MWD have been reached. This point can be easily predetermined by periodic sampling and analysis. The polymerization is then simply run under the conditions predetermined for each desired molecular weight and MWD.

MWD is calculated according to the equation $$MWD = \frac{M_w}{M_N}$$

where $M_w$ is the weight average molecular weight and $M_N$ is the number average molecular weight.

$M_N$ is determined by end group analysis by titration.

$M_w$ is determined by gel permeation chromatography or liquid chromatography.

When the desired molecular weight and MWD have been reached, polymerization is quickly quenched by bringing the reaction mass into intimate contact with water.

Unreacted monomer is then removed from the reaction mass by distillation, and the polymer is isolated by washing the mass free of initiator residue with water.

The foregoing describes the method of the invention run batchwise. It should be understood that it can also be run continuously, under the same conditions, in apparatus designed according to conventional chemical engineering principles.

EXAMPLE

Those skilled in the art will be able to practice this invention more easily after referring to the following illustrative example. These artisans will no doubt be able to compose numerous variations of the themes disclosed, such as changing the amounts of reactants slightly but insignificantly from those shown, adding innocuous substances, or substituting equivalent or nearly equivalent components for those shown. All these variations are considered to be part of the inventive concept.

In the example, all parts are by weight.

108 parts of THF (1.5 mols) were cooled to 0° C., and to it were then slowly added 75 parts (0.75 mol) of FSA. During the addition, the temperature of the mass was held at below 20° C.

The temperature of the mass was then allowed to rise to 50° C., was held at that level for five minutes, and then lowered to 0° C.

290 parts of THF were then rapidly added to the mass, and its temperature then held at 0° C. for 20 minutes.

Polymerization was then quenched by adding 300 parts of water to the reaction mass. Unreacted monomer was then boiled off, the hydrolysis products removed by washing the mass twice with water, the mass adjusted to pH 7.0 with base and dried under vacuum for about two hours.

The resulting PTMEG had a number average molecular weight of 1525 (as determined by end group titration) and a MWD of 1.25.

I claim:
1. A method for preparing poly(tetramethylene ether)glycol having a molecular weight distribution of 1.1–1.4, the method comprising
   (a) bringing tetrahydrofuran and a cationic initiator together
      (1) in a mol ratio such that the degree of polymerization will be at about a minimum, and
      (2) at a temperature which will promote generation of about a maximum number of tertiary oxonium ions;
   (b) keeping the resulting mixture at the temperature in (a 2) until the tertiary oxonium ion concentration is at or near a maximum, and then cooling the reaction mass in (a) to within the range −25° C. through +25° C.;
   (c) then adding enough THF to the reaction mass to allow the polymerization to proceed to the desired point;
   (d) then holding the reaction mass within the range −25° C. through +25° C. until the desired molecular weight and MWD have been reached; and then
   (e) quenching the polymerization.
2. The method of claim 1 wherein the cationic initiator is fluosulfonic acid.
3. The method of claim 2 wherein the tetrahydrofuran/fluosulfonic acid mol ratio in (a 1) is 4/1–1/1.
4. The method of claim 1 wherein the temperature in (a 2) is 20°–80° C.
5. The method of claim 1 wherein the temperature is (a 2) is 40°–60° C. and the mol ratio in (a 1) is 2/1.

* * * * *